March 22, 1927.  J. POWELL  1,622,207
HUSKING UNIT
Filed May 19, 1926    2 Sheets-Sheet 1

Inventor
John Powell,
By
Attorney

March 22, 1927.

J. POWELL 1,622,207

HUSKING UNIT

Filed May 19, 1926

Inventor

John Powell,

WITNESSES:—

By
Attorney

Patented Mar. 22, 1927.

1,622,207

UNITED STATES PATENT OFFICE.

JOHN POWELL, OF KOKOMO, INDIANA.

HUSKING UNIT.

Original application filed March 27, 1925, Serial No. 18,718. Divided and this application filed May 19, 1926. Serial No. 110,239.

This invention relates to harvesters and more particularly to husking units for corn harvesters such as that shown in my copending application Serial Number 18,718, filed Mar. 27, 1925, and of which this is a division.

One of the primary objects of the invention is to provide a corn husking unit so constructed as to avoid congestion of the ears in the unit and which permit an even distribution of the ears over the whole surface of the rolls of the unit.

Another object is to so construct a unit of this character that the husking rolls will obtain a firm hold on the smallest ears of corn as well as on the larger ones the rolls being yieldable to permit husks, stalks, etc., to pass between them.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which—

Similar reference characters designate corresponding parts throughout the several figures of the drawings.

Figure 1:
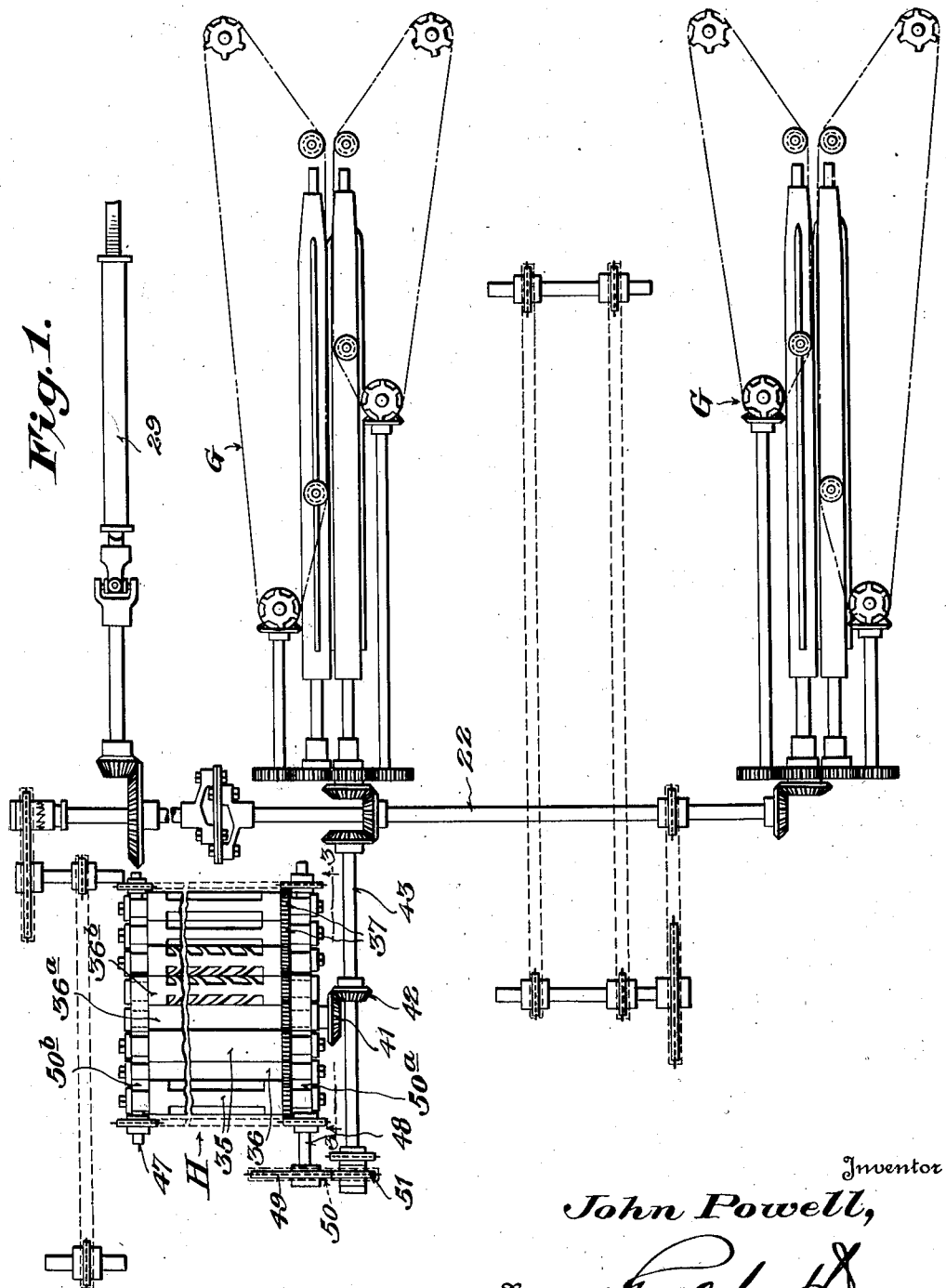
Figure 1 represents a diagrammatic view of a corn harvester with this improved husking unit shown applied.
Figure 2:
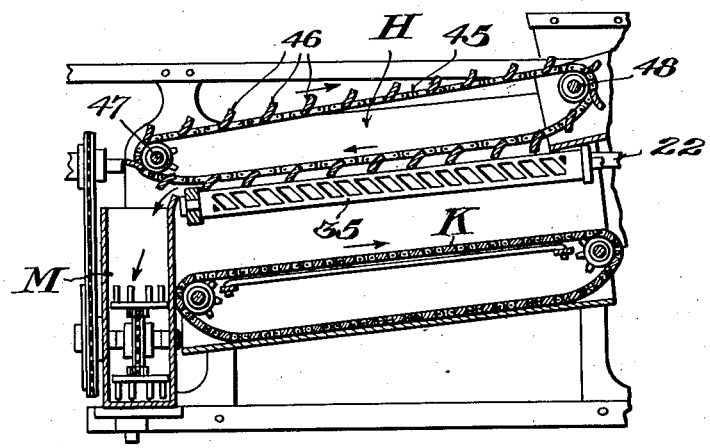
Fig. 2 is a cross-section thereof.

The relation of the present novel husking unit, designated generally as H to the operative parts of a corn harvesting machine are illustrated in Fig. 1 of the drawings wherein the corn gathering units G are more or less diagrammatically shown, as well as the means for operating the same. The operating means includes power received from any suitable source, such for example, as that shown in the parent application previously referred to, and which may be conveyed to a main shaft 22 through the medium of the power transmitting connections designated generally as 29.

As previously indicated the present invention contemplates a husking unit not only having the capacity for firmly gripping small as well as large ears, but especially constructed to maintain the ears evenly distributed over the roll. To that end the invention contemplates special features of construction and design which render the operation of the husking unit efficient under all conditions of use.

The husking unit which is generally designated as H removes the husks from the corn and deposits the husks on a waste conveyor indicated at K and located beneath the husking unit, while the ears of corn with the husks removed are delivered onto the lower collecting or receiving end of the wagon loading conveyor unit M.

Figure 3:
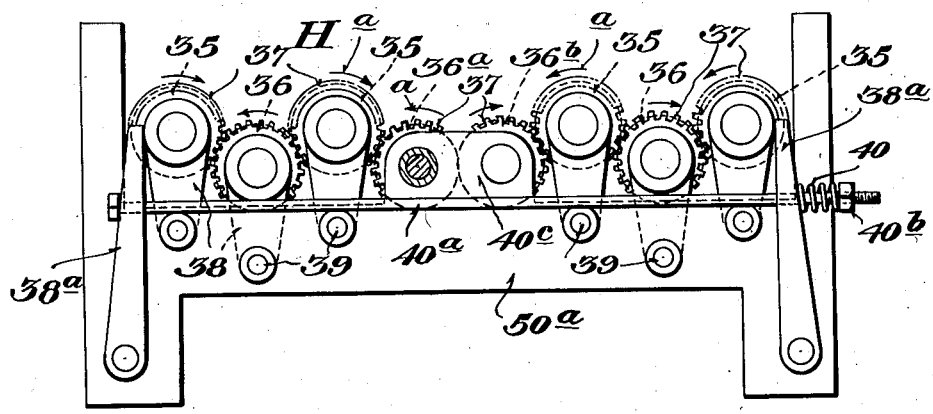
Fig. 3 is a section taken on the line 3—3 of Fig. 1 of the husking unit.

The husking unit H preferably includes in its organization a plurality of husking rolls 35 and 36 those adjacent each other being located in different planes so that all of the rolls of the unit are mounted in staggered relation in upper and lower parallel planes intersecting the axes of the upper rolls 35 and the lower rolls 36. As will be observed from Fig. 3 the said rolls are geared to each other by gears 37 and the opposite ends of the rolls are journaled in arms 38 pivoted as at 39 to the frame of the husking unit, while the end arms 38$^a$ of the end rolls are pressed inwardly by a spring 40 carried by a rod 40$^a$ which passes through the rocker arms 38$^a$ and holds them in contact with the outer rolls of the unit. An adjusting nut 40$^b$ is also carried by the rod 40$^a$ and provides for the husking rolls all being held in yielding contact, whereby the peripheries of all the rolls are caused to yieldingly engage each other to grip and pull off the husks of the ears of corn and at the same time permit the rolls to yield or give sufficiently to enable the coarse parts of the shucks to pass between the rolls without jamming or otherwise injuring the unit. The spring 40 also operates to retain the gears 37 of the rolls in mesh and one of the pair of said rolls 36$^a$ and 36$^b$ which have a stationary mounting in the husking frame, namely the roll 36$^a$, is provided with a shaft carrying a gear 41 which meshes with a gear 42 on a shaft 43 which is driven from the main power shaft 22 or by any suitable means. Thus, the husking rolls 35 and 36 of the husking unit H are driven in opposite directions simultaneously by the power received from the main shaft 22 through the shaft 43 and gears 41 and 42. In the arrangement shown it will be understood that the central pair of rolls have a fixed mounting in the husking frame while the rolls at opposite sides thereof are mounted on the pivoted arm 38, and the latter in turn are pressed inwardly by the spring 40 on the rod 40ª thereby maintaining the rolls in yielding contact and at the same time permit them to be reliably driven from the main shaft due to the position of the central fixed rolls. As shown in Fig. 3 the direction and location of the rolls is indicated by arrows $a$ and it will thus be seen that the rolls mounted in the upper plane all rotate toward the center of the unit which has a tendency to shift the ears of corn to the center of the unit. This arrangement gives the presser conveyor 45 which overlies the rolls a much better chance to keep the ears evenly distributed over the rolls than is possible when the upper rolls all rotate in the same direction.

As will be observed from Fig. 3 the central rolls 36ª and 36ᵇ which have a fixed mounting in the husking frame contribute materially to the efficiency of the husking unit, largely due to the fact that because they rotate in opposite directions they cause the upper rolls 35 at each side of the center of the unit to rotate in the direction of the arrows $a$ which results in feeding the ears of corn to be husked from the sides of the unit toward the center, thereby avoiding congestion of the ears in the husking unit which would be the case if all of the upper rolls 35 operated in the same direction. In the latter case all of the ears of corn would have a tendency to shift to one side of the unit which would materially interfere with the efficiency of the husking rolls. With the arrangement described, however, any tendency of the ears to collect or congest at the center of the husking unit is avoided under the pressure exerted by the conveyor 45 overlying the rolls, which conveyor will be presently described. In other words, the novel arrangement of the husking rolls shown in Fig. 3 permits of better distribution of ears over the whole surface of the rolls of the husking unit.

It will be seen that the husking rolls 35 and 36 are disposed transversely in the machine, and for the purpose of yieldingly forcing the ears bearing the husks into engagement with the husking rolls a flexible central conveyor 45 is mounted over the said rolls so that its lower flight will hold the ears of corn in contact with the husking rolls. The said flexible conveyor 45 carries therewith a plurality of transversely disposed slats or ribs 46 which materially assist in pressing the ears of corn into contact with the husking rolls. Also, it will be noted that the said conveyor 45 is mounted upon the sprocket shafts 47 and 48, the latter shaft carrying therewith a sprocket wheel 49 having a chain 50 passing thereover and in turn passing over a sprocket 51 on the shaft 43 previously referred to. In that way the presser-conveyor 45 is also operated by the main power shaft.

After the husks or shucks have been removed from the ears of corn it is proposed to remove the same towards the center of the harvester and deposit them on a waste conveyor indicated at K. The ears of corn which have been husked are deposited as previously explained in the receiving hopper M of the loading conveyor whereupon they may be elevated and deposited in any desired receptacle designed to receive them.

One of the distinctive features of this invention is the mounting of the rolls in different planes and the rotation of all the upper rolls toward the center with the two center rolls carried in fixed bearings, all of the rolls being driven from one of the center rolls. The center rolls rotate in a direction so that no husks or any material can pass between them requiring no spring feature for this part of the unit. This construction provides for maintaining the shaft carrying the center rolls in a fixed position so that the entire unit may be driven by beveled gears 41 and 42 as shown in Fig. 1.

The rolls above described are preferably mounted in a frame composed of two end members 50ª and 50ᵇ which are connected by any suitable bars preferably angle-iron.

While eight husking rolls are herein shown obviously the unit is not to be restricted to this number.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. In a corn harvesting machine, a corn husking unit including a plurality of husking rolls, and a central pair of said rolls being mounted in a stationary position and rotated in opposite directions, and the rolls at each side of said central pair being pivotally mounted and alternately journaled in planes above and coincident with the axis of the central pair of rolls.

2. In a corn harvesting machine, a corn husking unit comprising a frame, a plurality of relatively elongated rolls mounted with their peripheries in contacting relation and the central pair of said rolls being journaled in a fixed position in the frame, means for driving one of said central rolls whereby the same will rotate in opposite directions toward the sides of the unit, rolls pivotally mounted adjacent said central pair of rolls and journaled in a plane above a plane intersecting the axis of the central pair and adapted to rotate toward the center of the unit, and other rolls mounted at each side of said last mentioned rolls and alternately journaled in planes corresponding with the plane of mounting of the central pair of rolls and the plane of mounting of said last mentioned rolls.

3. A husking unit for corn harvesters including a plurality of husking rolls, one of said rolls being mounted in a stationary position and the rolls at either side thereof being transversely movable and alternately journaled in planes above and coincident with the axis of said stationary mounted roll.

4. A husking unit for corn harvesters mounted to receive shuck bearing ears, said unit comprising a plurality of adjacent pivotally mounted husking rolls, and a presser conveyor arranged above said husking rolls and adapted to travel in a direction parallel to the longitudinal axes of said rolls.

5. A husking unit for corn harvesters including a pair of husking rolls mounted to rotate in a fixed position, other husking rolls pivotally mounted at opposite sides of said first mentioned rolls, and pivotally mounted means for pressing the peripheries of said rolls in yielding contact, and means for driving one of the rolls which is mounted in a fixed position.

6. A husking unit for corn harvesters including a pair of husking rolls mounted to rotate in a fixed position, other husking rolls pivotally mounted at opposite sides of said first mentioned rolls and alternate ones of said rolls having their axes mounted out of transverse alinement, and means for pressing the peripheries of said pivotally mounted rolls in yielding contact, said means including a pair of pivotal arms embracing the rolls at opposite sides of the unit, and tensioning means for connecting said arms.

In testimony whereof I hereunto affix my signature.

JOHN POWELL.